United States Patent
Julie et al.

(10) Patent No.: US 6,760,664 B1
(45) Date of Patent: Jul. 6, 2004

(54) AUTONOMOUS NAVIGATION SYSTEM BASED ON GPS AND MAGNETOMETER DATA

(75) Inventors: Thienel K. Julie, Columbia, MD (US); Harman R. Richard, Elkridge, MD (US); Itzhack Y. Bar-Itzhack, Elkridge, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/178,546

(22) Filed: Jun. 25, 2002

Related U.S. Application Data
(60) Provisional application No. 60/301,363, filed on Jun. 25, 2001.

(51) Int. Cl.[7] .............................................. G01C 21/26
(52) U.S. Cl. ...................... 701/214; 701/200; 701/213; 342/357.06; 342/357.11; 342/357.12
(58) Field of Search ................................ 701/200, 207, 701/213, 214, 215, 226; 342/357.06, 357.11, 357.12, 357.16

(56) References Cited

U.S. PATENT DOCUMENTS

| | | | |
|---|---|---|---|
| 5,490,076 A | | 2/1996 | Rawicz et al. |
| 5,594,454 A | * | 1/1997 | Devereux et al. ....... 342/357.09 |
| 5,831,572 A | * | 11/1998 | Damilano .................... 342/352 |
| 6,114,995 A | * | 9/2000 | Ketchum .................... 342/457 |
| 6,144,918 A | | 11/2000 | Meng et al. |
| 6,305,221 B1 | | 10/2001 | Hutchings |
| 6,459,990 B1 | * | 10/2002 | McCall et al. .............. 701/220 |

* cited by examiner

Primary Examiner—Gertrude A. Jeanglaude
(74) Attorney, Agent, or Firm—Chan K. Park

(57) ABSTRACT

This invention is drawn to an autonomous navigation system using Global Positioning System (GPS) and magnetometers for low Earth orbit satellites. As a magnetometer is reliable and always provides information on spacecraft attitude, rate, and orbit, the magnetometer-GPS configuration solves GPS initialization problem, decreasing the convergence time for navigation estimate and improving the overall accuracy. Eventually the magnetometer-GPS configuration enables the system to avoid costly and inherently less reliable gyro for rate estimation. Being autonomous, this invention would provide for black-box spacecraft navigation, producing attitude, orbit, and rate estimates without any ground input with high accuracy and reliability.

24 Claims, 7 Drawing Sheets

AUTONOMOUS NAVIGATION SYSTEM BASED ON GPS AND MAGNETOMETER DATA

CROSS-REFERENCES TO RELATED APPLICATIONS

This application now formalizes and incorporates herein by reference Provisional Application Serial No. 60/301,363, "Autonomous Navigation System Based on GPS and Magnetometer Data" Richard R. Harman, et al., filed on Jun. 25, 2001. Applicant claims the priority date thereof under 35 U.S.C. 119(e).

ORIGIN OF THE INVENTION

The invention described herein was made by employees of the United States Government. The invention may be manufactured and used by or for the governmental purposes without the payment of royalties thereon or therefor.

FIELD OF THE INVENTION

The present invention is directed to a method and apparatus for an autonomous navigation system for estimating a set of satellite navigation parameters based on measurements from Global Positioning System (GPS) and magnetometers.

BACKGROUND OF THE INVENTION

GPS has become a standard method for low cost onboard satellite orbit determination. The use of a GPS receiver as an attitude and rate sensor has also been developed in the recent past. GPS is emerging as the favored technique that provides sufficient accuracy for most requirements.

However, GPS requires expensive gyroscopes (gyros) or star trackers to be fully functional and provide accurate attitude data. In addition, GPS is subject to initialization delays and signal drop-outs that require back up systems to fill in during the loss of GPS data.

SUMMARY OF THE INVENTION

This invention presents a method and apparatus for processing GPS phase, pseudo-range, and range rate data as well as magnetometer data to produce estimates of attitude, angular rate, position, and velocity for a spacecraft, especially a low earth orbit (LEO) satellite.

Magnetometers are a low cost and reliable technology that have been used to determine satellite orbit and attitude based on the earth's magnetic field. Magnetometers always output data as they are not subject to occultation or tracking problems.

Although GPS is relatively a low-cost sensor, providing accurate orbit estimates, with coarse attitude estimates, GPS based systems are subject to initialization problems, and must rely on costly systems such as gyros. However, GPS data is available continuously throughout the orbit and can produce more accurate orbit, attitude, and rate estimates by combining it with magnetometer data.

The present invention solves the drawbacks associated with GPS-based systems as mentioned above, by coupling GPS with reliable and low cost magnetometers. By processing the orbit and attitude solutions in the same algorithm in a single self-contained unit, weight, size, and power consumption are reduced. Completely autonomous satellite navigation is thus possible with reduced weight and cost.

The method used is an extended Kalman filter (EKF), blended with a pseudo-linear Kalman filter algorithm, developed to provide estimates of attitude, orbit, and rate estimates using magnetometer and GPS data. The magnetometer based EKF can converge from large initial errors in orbit, attitude, and rate. Combining the magnetometer and GPS data into a single EKF provides a more robust and accurate system that produces estimates of attitude, angular rate, position, and velocity for a spacecraft.

Some publications listed, relating to the present invention, are incorporated by reference:

1. Deutschmann, J., R. Harman, and I. Bar-Itzhack, "An Innovative Method for Low Cost, Autonomous Navigation for Low Earth Orbit Satellites", *Proceedings of the AAS/AIAA Astrodynamics Specialists Conference*, Boston, Mass., Aug. 10–12, 1998.
2. Oshman, Y, and F. L. Markley, "Spacecraft Attitude/Rate Estimation Using Vector—Aided GPS Observations", *IEEE Transactions on Aerospace and Electronic Systems*, Vol. 35, No. 3, July 1999.
3. Deutschmann, J., and I. Bar-Itzhack, "Comprehensive Evaluation of Attitude and Orbit Estimation Using Real Earth Magnetic Field Data", *Proceedings of the $11^{th}$ Annual AIAA/USU Conference on Small Satellites*, Logan, Utah, Sep. 15–18, 1997.
4. Bar-Itzhack, I., "Classification of Algorithms for Angular Velocity Estimation", *Journal of Guidance, Dynamics, and Control*, Vol. 24, No. 2, March–April 2001.
5. Deutschmann, J., R. Harman, and I. Bar-Itzhack, "A LEO Satellite Navigation Algorithm Based on GPS and Magnetometer Data", *Proceedings of the CNES $15^{th}$ International Symposium on Space Flight Dynamics*, Biarritz, France, Jun. 26–30, 2000.
6. Brown, Robert Grover, and Patrick Y. C. Hwang, *Introduction to Random Signals and Applied Kalman Filtering*, ($3^{rd}$ ed.), John Wiley & Sons, 1997.
7. Wertz, James. R, editor, *Spacecraft Attitude Determination and Control*, D. Reidel Publishing Company, 1984.
8. Shorshi, G. and I. Bar-Itzhack, "Satellite Autonomous Navigation Based on Magnetic Field Measurements", *Journal of Guidance, Control, and Dynamics*, Vol. 18, No. 4, July–August, 1995.

DETAILED DESCRIPTION OF PREFERRED EMBODIMENTS OF THE INVENTION

Figure 1:
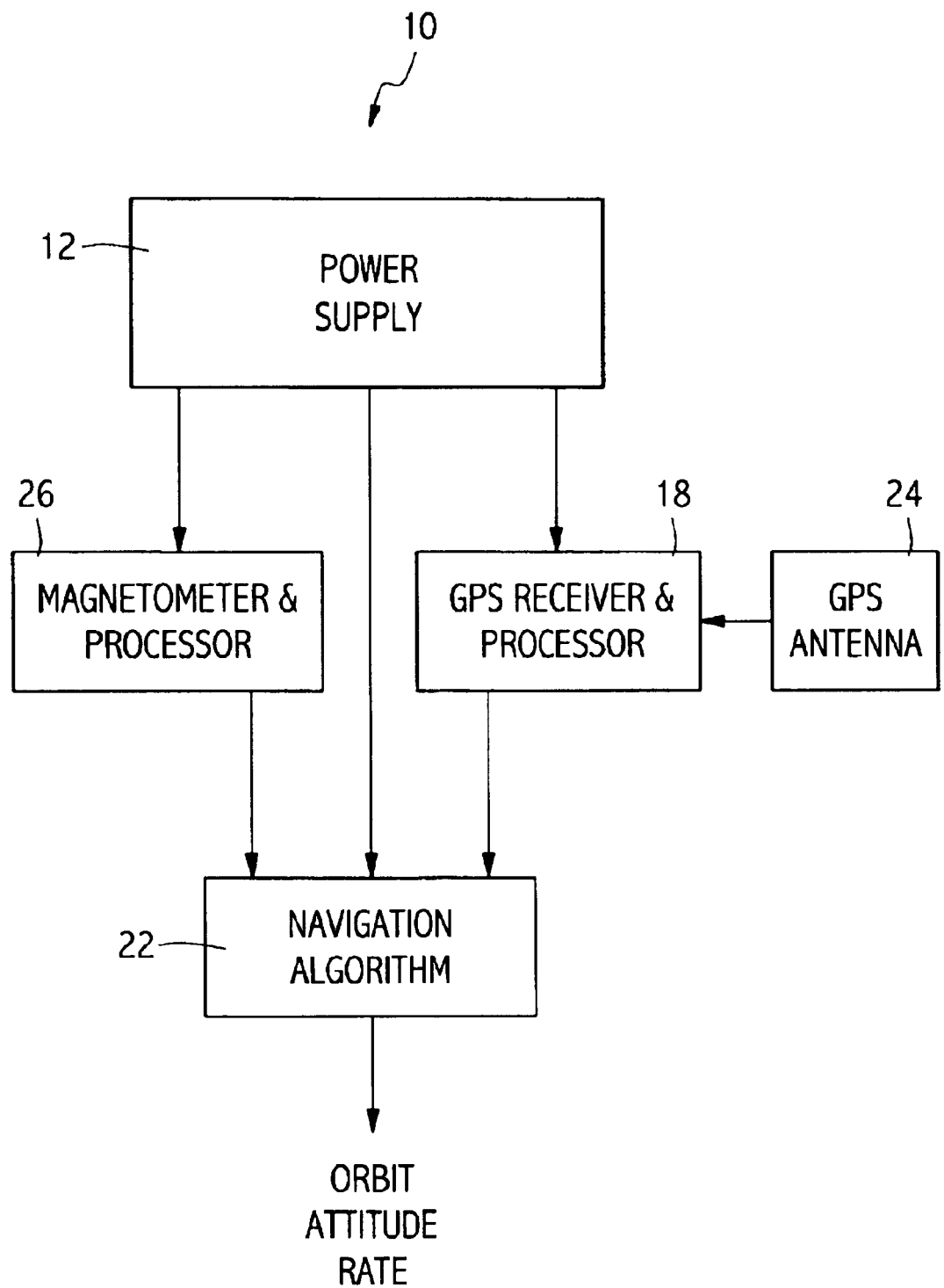
FIG. 1 shows a block diagram of an autonomous navigation system based on GPS and magnetometer data.

FIG. 1 shows a block diagram of an autonomous navigation system 10 based on data from GPS and magnetometer 26. The system includes GPS receiver 18, magnetometer 26, process electronics and interface, and the navigation algorithm 20 embedded on a process board containing navigation algorithm 20, and power supply 12 (either external or internal).

The GPS/magnetometer navigation system is based on an extended Kalman filter algorithm, blended with a pseudo-linear Kalman filter. The general EKF equations are:

$$\underline{\dot{X}}(t) = \underline{f}(\underline{X}(t), t) + \underline{w}(t) \tag{1}$$

$$\underline{Z}_{k+1} = \underline{h}_{k+1}(\underline{X}(t_{k+1})) + \underline{n}_{k+1} \tag{2}$$

The general equations for the pseudo-linear Kalman filter are:

$$\underline{\dot{X}}(t) = F(\underline{\hat{X}}(t_k)) * \underline{X}(t) + \underline{w}(t) \tag{3}$$

$$\underline{Z}_{k+1} = H_{k+1} * \underline{X}_{k+1} + \underline{n}_{k+1} \tag{4}$$

The output filter state is given as $$\underline{X}^T = [\underline{R}^T, \underline{V}^T, \underline{C}^T, \underline{q}^T, \underline{\omega}^T, \underline{b}^T]$$

where $\underline{R}$ and $\underline{V}$ are the spacecraft position and velocity vectors, respectively, $\underline{C}$ is a vector of GPS receiver clock errors, $\underline{q}$ is the attitude quaternion, $\underline{\omega}$ is the rotation rate, $\underline{b}$ is the magnetic field in body coordinates.

The filter processes data from the magnetometer, a 2-baseline GPS receiver, and reaction wheels (used in Euler's equations). The GPS data, as mentioned, consists of range, range-rate (if available, or reliable), and phase measurements. Nominally, the filter first propagates the state estimate and filter covariance and then performs an update with the magnetometer data followed by an update with the GPS data. Data from one, two, or more GPS satellite observations are included in each update. The propagation of the state estimate and the filter covariance will be described first. The description of the state and covariance update will follow, including the development of both the magnetometer and GPS measurement matrices.

Filter Propagation

The dynamics for the position and velocity, the quaternion, and the rotation rate and b are treated as uncoupled. The position and velocity are propagated numerically with a simple two-body model which can include j2 and other higher order terms, using equation (1). The clock errors are propagated according to a two state random-process model. The quaternion is propagated numerically using the kinematic equation. Finally, the rotation rate is propagated using Euler's equation and $\underline{b}$ is propagated with the equation expressing the time rate of change of a vector with respect to a rotating coordinate system. The two equations are augmented as $$\begin{bmatrix} \underline{\dot{\omega}} \\ \underline{\dot{b}} \end{bmatrix} = \begin{bmatrix} I^{-1}[(I\underline{\hat{\omega}} + \underline{h})x] & 0 \\ B & 0 \end{bmatrix} \begin{bmatrix} \underline{\omega} \\ \underline{b} \end{bmatrix} + \begin{bmatrix} I^{-1}(\underline{T} - \underline{h}) \\ \underline{U} \end{bmatrix} \tag{5}$$

where $B = [\underline{b}_m x]$=cross product matrix containing the measured magnetic field vector, $\underline{b}_m$ $I$=inertia matrix $\underline{h}$=angular momentum of reaction wheels $\underline{T}$=external torques on the spacecraft $$\underline{U} = D\underline{b}_r$$

$D$=direction cosine matrix which transforms from inertial to body coordinates $\underline{b}_r$=reference magnetic field vector in inertial coordinates, computed from the estimated position Equation (5) is treated as a 'pseudo-linear', equation in which the dynamics matrix contains the current best estimate of the rate, $$\underline{\hat{\omega}}.$$

The filter covariance matrix is propagated according to $$P_{k+1}(-) = \Phi_k(\underline{\hat{X}}_k(+))P_k(+)\Phi_k^T(\underline{\hat{X}}_k(+)) + Q_k \tag{6}$$

$\Phi$=the state transition matrix=$e^{F\Delta t}$.

$F=\partial \underline{f}/\partial \underline{X}$

Q=matrix of standard deviations of the white noise processes driving each of states.

In general, the linearized error dynamics are given as $$\underline{\dot{x}}(t) = F * \underline{x}(t) \tag{7}$$

Where the dynamics matrix, F, is computed for the position, velocity, and quaternion. The error state is represented by $\underline{x}$ for the position, velocity and quaternion. The rate and $\underline{b}$ state equation is linear and therefore the dynamics matrix is given in (5) (and is used to propagate the error in the actual states $\underline{\omega}$ and $\underline{b}$). The matrix F is partitioned as $$F = \begin{bmatrix} F_{orbit} & 0 & 0 & 0 \\ 0 & F_{clock} & 0 & 0 \\ 0 & 0 & F_{attitude} & 0 \\ 0 & 0 & 0 & F_{rate,b} \end{bmatrix} \tag{8}$$

where:

$F_{orbit} = \partial \underline{f}_{orbit}/\partial \underline{X}$ $\underline{f}_{orbit}^T = [\underline{V} \ -\mu * \underline{R}/|\underline{R}|^3]$ $$F_{clock} = \begin{bmatrix} 1 & 0 \\ 0 & 0 \end{bmatrix}$$

$$F_{attitude} = [\underline{\omega} x]$$

$$F_{rate,\underline{b}} = \begin{bmatrix} I^{-1}[(I\hat{\underline{\omega}} + \underline{h})x] & 0 \\ B & 0 \end{bmatrix}$$

The filter uses the 'multiplicative' approach in the attitude estimation, therefore the error state for the attitude is a vector of attitude errors.

Filter Update

The EKF state and covariance update equations are given as $$\hat{X}_{k+1}(+) = \hat{X}_{k+1}(-) + K_{k+1}[\underline{y}_{k+1} - h_{k+1}(\hat{X}_{k+1}(-))] \quad (9)$$

$$P_{k+1}(+) = [I - K_{k+1} H_{k+1}(\hat{X}_{k+1}(-))] \quad (10)$$
$$P_{k+1}(-)[I - K_{k+1} H_{k+1}(\hat{X}_{k+1}(-))]^T + K_{k+1} R K_{k+1}^T$$

The Kalman gain is computed according to $$K_{k+1} = \quad (11)$$
$$P_{k+1}(-) * H_{k+1}^T(\hat{X}_k(-))[H_{k+1}(\hat{X}_k(-))P_{k+1}(-)H_{k+1}^T(\hat{X}_k(-)) + R_{k+1}]^{-1}$$

where $H = f\underline{h}/fX$

The measurement matrix, H, is partitioned as $H=[H_{orbit}, H_{attitude}, H_{rate,\underline{b}}]$. The individual measurement matrices are defined according to the two measurements used, namely the magnetometer measurement and the GPS phase, range, and range-rate (if used) measurements. First, the development of the magnetometer measurement matrix will be presented, followed by the derivation of the measurement matrix for GPS.

Magnetometer Update

The measurement matrix for the orbit terms, $H_{orbit}$, was developed in Reference 8 in terms of spherical coordinates. The additional relationship to express the partial derivative in terms of the position and velocity is straightforward. Obviously, the portion of $H_{orbit}$, related to the clock errors is zero for the magnetometer. The measurement matrix for the attitude states is given as $$H_{attitude} = [-\underline{b}_m x] \quad (12)$$

The innovations for both the orbit states and the attitude states is given as $$Z_{k+1} = \underline{b}_m \hat{D} \underline{b}_r \quad (13)$$

where $\hat{D} = (I - [\underline{\alpha}x])D$ = the direction cosine matrix computed with the filter estimated quaternion; and $D$ = true direction cosine matrix which transforms from inertial to body coordinates.

Finally, the measurement matrix, $H_{rate,\underline{b}}$, for the rate and $\underline{b}$ is defined by the following linear relationship.

$$\begin{bmatrix} 0 & I \end{bmatrix} \begin{bmatrix} \omega \\ \underline{b} \end{bmatrix} = H_{rate,b} \begin{bmatrix} \omega \\ \underline{b} \end{bmatrix} \quad (14)$$

The innovations for the rate and $\underline{b}$ states is then $$Z_{k+1} = \underline{b}_m - H_{rate,z} \hat{X}_{rate,b,k+1}(-) \quad (15)$$

where $\hat{X}_{rate,b,k+1}(-)$ = the estimated rate and $\underline{b}$ components of the state vector, and the other parameters are as defined above. This defines the estimation approach for the magnetometer update.

GPS Update

The measurement matrix for the position, velocity, and clock states (combined) is a standard model based on range and range-rate data (actual GPS measurements would be pseudo-ranges and delta-ranges, but for the purposes of testing, range and range-rate measurements were generated). The measurement matrix is obtained by linearizing the range and range-rate equations that are functions of the spacecraft position and velocity, respectively. (If the range-rate is not used, the matrix only contains the range development.) The resulting measurement matrices are $$H_{orbit} = \begin{bmatrix} c_x & c_y & c_z & 0 & 0 & 0 & 1 & 0 \\ 0 & 0 & 0 & c_x & c_y & c_z & 0 & 1 \end{bmatrix} \quad (16)$$

Where $c_x$, $c_y$, $c_z$, are the appropriate direction cosines between the spacecraft and the GPS satellite in view. The innovations are computed by differencing the measured range and range-rate with the computed values (computed range and range-rate are based on the filter estimated position and velocity), given as $$Z_{k+1} = \frac{\rho}{\rho_{k+1}} - \frac{\rho_c}{\dot{\rho}_{ck+1}} \quad (17)$$

where $\rho, \rho C$ = measured and computed range, respectively and $\dot{\rho}, \dot{\rho}C$ = measured and computed range-rate, respectively.

The measurement matrix for the attitude states is found by linearizing the relationship between the phase measurement and the line of sight vector to the GPS satellite in view of the antenna. Assuming a 2-baseline GPS receiver, the phase measurement for a given baseline can be written as $$y_{ji} = \underline{a}_j^T D \underline{s}_{ri} + v_i \quad (18)$$

i=GPS satellite designation
j=antenna designation (j=1, 2)
y=the phase measurement
$\underline{a}_j$=unit vector representing the baseline direction for antenna j
$\underline{s}_{ir}$=unit vector to GPS satellite i, in inertial coordinates
$v_i$=white sequence measurement noise The computed phase measurement is given as:

$$\hat{y}_{ji} = \underline{a}_j^T \hat{D} \underline{s}_{ri} \quad (19)$$

The innovations, $Z_{k+1}$, is computed by subtracting (19) from (18). The equation can then be recast to produce the necessary linear relationship between the $Z_{k+1}$ and the attitude error vector, defining the attitude measurement matrix for the phase measurements $$Z_{ji} = y_{ji} - \hat{y}_{ji} = -\underline{a}_j^T[\underline{s}_{ai,m} \times]\underline{\alpha} + v_i = H_{att}\underline{\alpha} + v_i \qquad (20)$$

where $$s_{ai,m} = \begin{bmatrix} y_{1i} \\ y_{2i} \\ \sqrt{1 - y_{1i}^2 - y_{2i}^2} \end{bmatrix} =$$

measured unit vector to GPS satellite $i$ in body coordinates;

and $\underline{\alpha}$=attitude error state

Finally, the measurement matrix for the rate states is developed by first differentiating the cosinc of the angle between the baseline and the line of sight to a given GPS satellite gives (dropping the satellite and antenna designations)

$$-\sin(\theta)\dot{\theta} = \dot{a}^T D s_r + a^T \dot{D} s_r + a^T D \dot{s}_r \qquad (21)$$

where the quantities are as defined above. Substituting in the kinematic equation for the direction cosine matrix, and noting that $$\dot{a} = 0$$

gives $$-\sin(\theta)\dot{\theta} = -a^T[\omega \times]Ds_r + a^T D\dot{s}_r \qquad (22)$$

Defining the 'measurement' to be $$y_\omega = a^T \hat{D}\dot{s} + \sin(\theta)\dot{\theta} \qquad (23)$$

and the measurement matrix, $H_{rate,b}$ as $$H_{rate,b} = [[\hat{D}\underline{s}]^T[\underline{a}\times] 0_{1\times 3}] \qquad (24)$$

results in the following linear update equation $$y_\omega = H_{rate,t}\underline{X}_{rate,b} + \eta \qquad (25)$$

The innovations for the rate estimation are then given as $$Z = y_\omega - H_{rate,b}\hat{X}_{rate,b} \qquad (26)$$

where $$\hat{X}_{rate,b} = \text{the estimated rate}$$

and $\underline{b}$ state elements.

The elements in $y_\omega$, given in (23), are computed numerically. The derivative of the line of sight, $$\dot{s},$$

can be computed from the given GPS position and velocity and the estimated position and velocity. The angle, $\theta$, is computed from the phase measurement and is numerically differentiated. This defines the derivative approach for GPS. Alternatively, the 'estimation approach' could be utilized for the GPS rate estimation.

Augmentation of GPS Phase Measurement

Now the estimation approach is applied to the GPS phase measurements, which contains either the phase measurement states for one GPS observation, two, or more.

The output filter state is given as $$\underline{X}^T = [\underline{R}^T, \underline{V}^T, \underline{C}^T, q^T, \omega^T, \underline{b}^T, \underline{z}^T] \qquad (27)$$

Filter Propagation

Again the dynamics for the position and velocity, the quaternion, and $\underline{\omega}$, $\underline{b}$, and $\underline{z}$ are treated as uncoupled. The position and velocity are propagated numerically with a two body gravity model which includes the j2 term. The clock errors are propagated according to a two state random-process model. The quaternion is propagated numerically using the kinematics equation.

The rotation rate is propagated using Euler's equation. The states $\underline{b}$ and $\underline{z}$ are propagated with the equation expressing the time rate of change of a vector with respect to a rotating coordinate system. The equation for the rate and $\underline{b}$ are presented above.

Following is the development of the equation expressing the time rate of change of the elements of $\underline{z}$.

The expression for a single GPS phase measurement is given as $$z_{ij} = \vec{a}_i \cdot \vec{s}_j \qquad (28)$$

where $Z_{ij}$=phase measurement;

$\vec{a}_i$=unit vector in direction of baseline i(i=1,2); and $\vec{s}_j$=unit vector in direction of a GPS satellite (j=1 or 2).

Equation (28) can also be written as (dropping the subscripts)

$$z = \underline{a}^T \underline{s}_b = \underline{a}^T D \underline{s}_I \qquad (29)$$

where $\underline{a}$=baseline direction expressed in body coordinates;

D=direction cosine matrix, transforms from inertial to body coordinates; and $\underline{s}_I$=satellite to GPS direction expressed in inertial coordinates.

Taking the derivative of (29) results in the following $$\dot{z} = \underline{a}^T \dot{D} \underline{s}_I + \underline{a}^T D \dot{\underline{s}}_I \qquad (30)$$

The time derivative of the direction cosine matrix can be written as $$\dot{D} = -[\underline{\omega} \times]D \qquad (31)$$

where $[\underline{\omega} \times]$=cross product matrix of the rotation rate.

Substituting (31) into (30) and reordering the vectors gives $$\dot{z} = \underline{a}^T[\underline{s}_b \times]\underline{\omega} + \underline{a}^T \hat{D}\dot{\underline{s}}_I \qquad (32)$$

where $[\underline{s}_b \times] = [\hat{D}\underline{s}_I \times]$=cross product matrix of the GPS direction unit vector in body coordinates;

$\hat{D}$=current estimate of the direction cosine matrix which transforms from inertial to body coordinates; and $\dot{\hat{s}}_I$=derivative of the GPS direction unit vector in inertial coordinates, this is not computed numerically but is developed from the relative position and velocity vectors.

Development of the GPS Line of Sight Derivative is discussed here. The position vector from the spacecraft to a GPS satellite is given as $$R_s = R_{sv} - R \qquad (33)$$

where $R_{sv}$=the position vector of the GPS satellite from the center of Earth; and $R$=the position vector of the satellite from the center of Earth.

The GPS line of sight unit vector is then given as $$\vec{s} = \frac{R_s}{|R_s|} \qquad (34)$$

Taking the derivative of $\vec{s}$ results in $$\dot{\vec{s}} = \frac{d}{dt} \frac{1}{|R_s|} \sqrt{R_s} + \frac{1}{|R_s|} R_s \qquad (35)$$

The first term on the right hand side of (35) can be written as $$\frac{d}{dt}\left(\frac{1}{|R_s|}\right) = -\frac{R_s \cdot V_s}{|R_s|^3} \qquad (36)$$

where $V_s = V_{sv} - V = \dot{R}_s$=the relative velocity of the GPS satellite with respect to the spacecraft Substituting (36) into (35) results in $$\dot{\vec{s}} = -\frac{R_s ? V_s}{|R_s|^3} R_s + \frac{1}{|R_s|} V_s \qquad (37)$$

The GPS position and velocity vectors $R_{sv}$ and $V_{sv}$, respectively, are provided. However, only estimates of the spacecraft position and velocity vectors R and V, respectively, are available. Resolving all the vectors in inertial coordinates, and substituting in the estimated values results in the following expression for the derivative of the GPS line of sight vector implemented into the EKF algorithm.

$$\dot{\hat{s}}_I = -\frac{\hat{R}_{s,I}^T \hat{V}_{s,I}}{|\hat{R}_{s,I}|} \hat{R}_{s,I} + \frac{1}{|\hat{R}_{s,I}|} \hat{V}_{s,I} \qquad (38)$$

where the ^ symbol refers to estimated values, and the 'I' refers to inertial coordinates.

The vector $\underline{z}$ is formed from the individual phase measurements, $z_{ij}$ (either two components for the two baselines and one GPS satellite or four components for the two baselines and two GPS satellites, or two for each GPS satellite observed if more than two are observed). Equation (32) is then written in the general form as $$\dot{\underline{z}} = F_z \omega + \underline{u} \qquad (39)$$

Equation (39) is used to propagate $\underline{z}$ numerically.
In general, the linearized error dynamics are given as $$\dot{\underline{x}}(t) = F \underline{x}(t) \qquad (40)$$

where $F = f\underline{f}/f\underline{X}$

The full dynamics matrix, F, is given above as well as in Reference 1 for all the states except the phase measurement states, $\underline{z}$. The matrix Fz from (39) into augmented into the matrix F as $$F = \begin{bmatrix} F_{orbit} & 0 & 0 & 0 \\ 0 & F_{clock} & 0 & 0 \\ 0 & 0 & F_{attitude} & 0 \\ 0 & 0 & 0 & F_{rate,b,z} \end{bmatrix}$$

The filter covariance matrix is propagated according to $$P_{k+1}(-) = \Phi_k(\hat{X}_k(+))P_k(+)\Phi_k^T(\hat{X}_k(+)) + Q_k \qquad (41)$$

where $\Phi$=the state transition matrix=$e^{F\Delta t}$; and

Q=matrix of standard deviations of the white noise processes driving each of the states.

The filter uses the 'multiplicative' approach in the attitude estimation[3], therefore the error state for the attitude is a vector of attitude errors.

Filter Update

The measurement matrix, H, is partitioned as H=[$H_{orbit}$, $H_{attitude}$, $H_{rate,b,z}$]. The individual measurement matrices are defined according to the two measurements used, namely the magnetometer measurement and the GPS phase and range measurements. The development of the magnetometer and GPS measurement matrices are above. The development of the GPS measurement matrix for the position and velocity states as above includes both range and range-rate type measurements. In the current version of the EKF, only range measurements are included.

GPS Phase Measurement State Update

According to the development of the 'estimation approach' given in Reference 4, the measured phase $\underline{z}_m$, is related trivially to the rate and the state $\underline{z}$ as $$\underline{z}_m = \begin{bmatrix} 0 & 0 & I \end{bmatrix} \begin{bmatrix} \omega \\ \underline{b} \\ \underline{z} \end{bmatrix} + \underline{\eta} = H_{rate,b,z} X_{rate,b,z} + \underline{\eta} \qquad (42)$$

where $\underline{\eta}$=added white noise

The innovations are then computed as $$\underline{Z} = \underline{z}_m - H_{rate,b,z} X_{rate,b,z} \qquad (43)$$

and are used in the update equations for a linear Kalman filter. The $H_{rate,b,z}$ matrix replaces the portion of the GPS measurement matrix developed for the 'derivative approach' given in Reference 5.

The use of the 'estimation approach' for GPS requires the initialization of the $\underline{z}$ states whenever a new GPS satellite is being observed. The states are initialized a priori with the first phase observations. The covariance is initialized with the a priori values and the correlation terms are set to zero.

Simulations and Results

Case 1

The test scenario consisted of a simulated orbit for a low earth orbit spacecraft and simulated orbits for the GPS constellation. The spacecraft rotated at a 1 revolution per orbit rate about the y body axis in an earth pointing attitude, at an altitude of 700 km and inclination of 98 degrees. The two GPS antennas are aligned along the spacecraft x and y body axes, on the anti-nadir side of the spacecraft. The magnetometer is aligned along the spacecraft body axes. The magnetometer and reaction wheel data contained an added white noise, the GPS measurements had no corruption. All the data was output at a rate of 1 Hz. The errors between the true state and the a priori filter state are given in Table I, except for the state, $\underline{b}$. The state, $\underline{b}$, was initialized with the first magnetometer measurement. The true state of the filter is output at 1 Hz also.

TABLE 1

A Priori Errors in the Filter State

| STATE | ERROR |
| --- | --- |
| Position | 100 km/axis |
| Velocity | 0.5 km/sec/axis |
| Quaternion | 12 deg rotation error |
| Rate | Orbit rate in the pitch axis only |

Results

Figure 2:
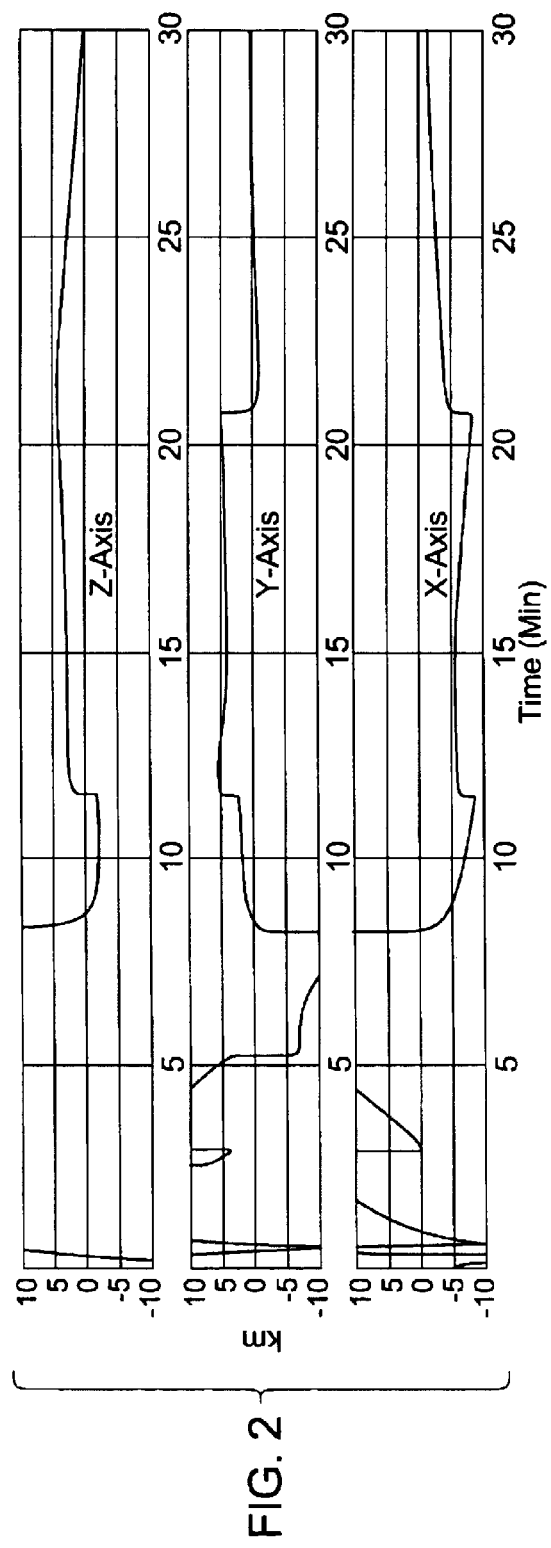
FIG. 2 shows the position errors about each axis of the Simulation Case 1.
Figure 3:
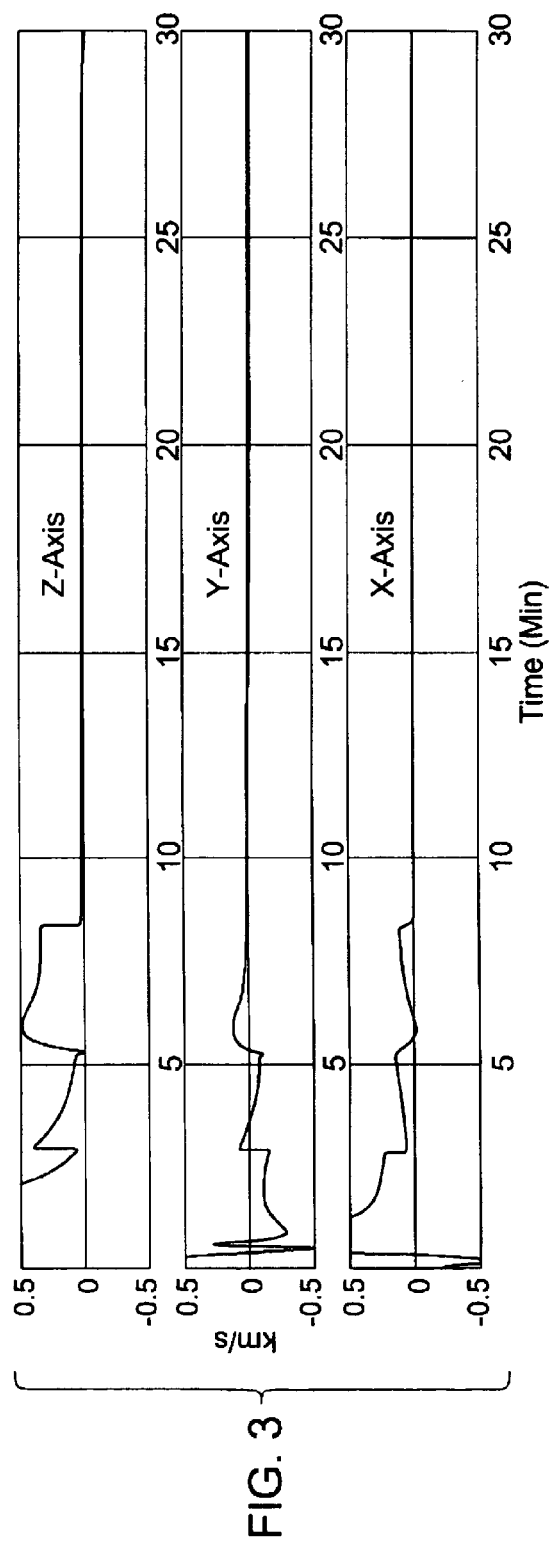
FIG. 3 shows the velocity errors about each axis of the Simulation Case 1.
Figure 4:
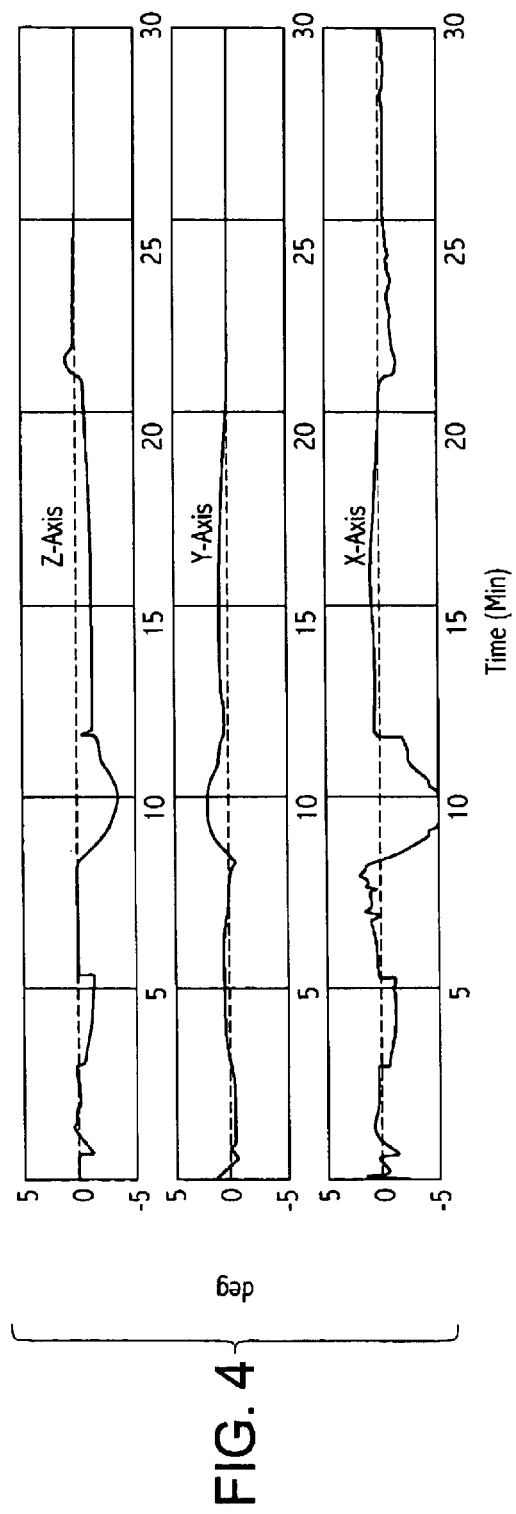
FIG. 4 shows the angular attitude error about each of the body axes of the Simulation Case 1.
Figure 5:
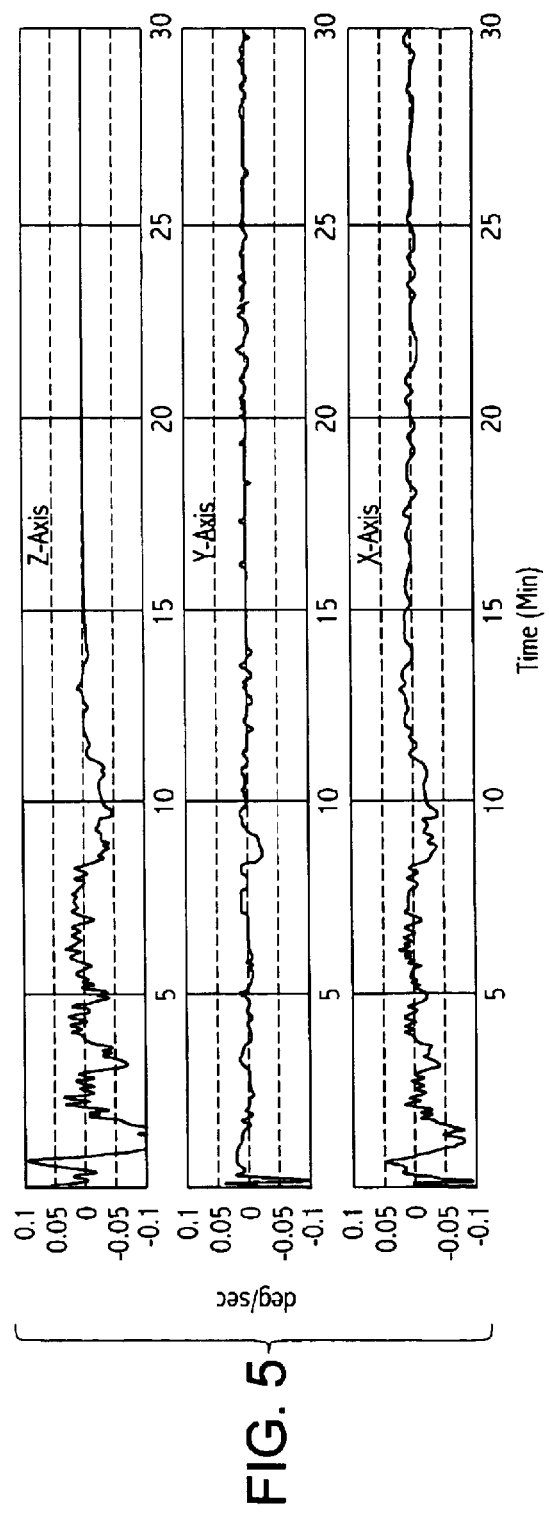
FIG. 5 shows the rate errors about each axis of the Simulation Case 1.

The initial test of the GPS/magnetometer navigation system included 30 minutes of simulated data. FIGS. 2 through 5 show the results of this first test. All the state parameters plotted appear to be converging after approximately 10 minutes. All of the states experience large deviations during the first 10 minutes. FIG. 2 shows the position errors about each axis. By 30 minutes the errors are approximately 1 km in each axis. FIG. 3 shows the velocity errors about each axis. FIG. 4 shows the angular attitude error about each of the body axes. By 30 minutes the errors are reduced to less than 1 degree in each axis. Finally, FIG. 5 shows the rate errors about each axis. The rate errors in the x and y body axes look noisier than those in the z body axis. A plot of the additional state that was added according to the estimation approach of is not included. It follows the magnetic field vector in body coordinates, as expected. In this preliminary test case, the filter included data from the magnetometer and only one GPS satellite per update cycle. Additional GPS satellites in view could easily be processed per update cycle. Advantages of processing only one per cycle are the reduction in processing time per update and in the reduction of data that must be carried between two update cycles (for use in the derivative computations).

Case 2

The test scenario consisted of an orbital ephemeris of the Upper Atmosphere Research Satellite (UARS) spacecraft and simulated orbits for the GPS constellation. The spacecraft is inertially pointing on an orbit whose average altitude is 575 km, its inclination is 57 degrees, and its eccentricity is 0.0015. The simulation generated from the UARS ephemeris consists of 12 hours of sensor and reaction wheel data. After 6 hours, an attitude maneuver is simulated about the y axis at a rate of 0.2 deg/sec for 6.63 minutes (giving a total maneuver of 80 degrees). Two GPS antennas are aligned along the spacecraft x and y body axes and one at the origin, pointing in the −z body axis direction. A magnetometer is aligned along the spacecraft body axes. The simulated magnetometer and GPS phase and range data contain added white noise, with standard deviations of 1 milliGauss, 1 degree, and 2 m, respectively. All the data are output at a rate of 2 Hz. The initial errors between the true state and the a priori filter state are given in Table I, except for the states $\underline{b}$ and $\underline{z}$. The states $\underline{b}$ and $\underline{z}$ are initialized with the first magnetometer and GPS phase measurements, respectively.

TABLE 2

INITIAL A PRIORI ERRORS IN THE FILTER STATE

| STATE | ERROR |
| --- | --- |
| Position | 1100 km (RSS) |
| Velocity | 0.6 km (RSS) |
| Quaternion | 111 deg rotation error |
| Rate | 0.06 deg/sec/axis |

Results

Figure 6:
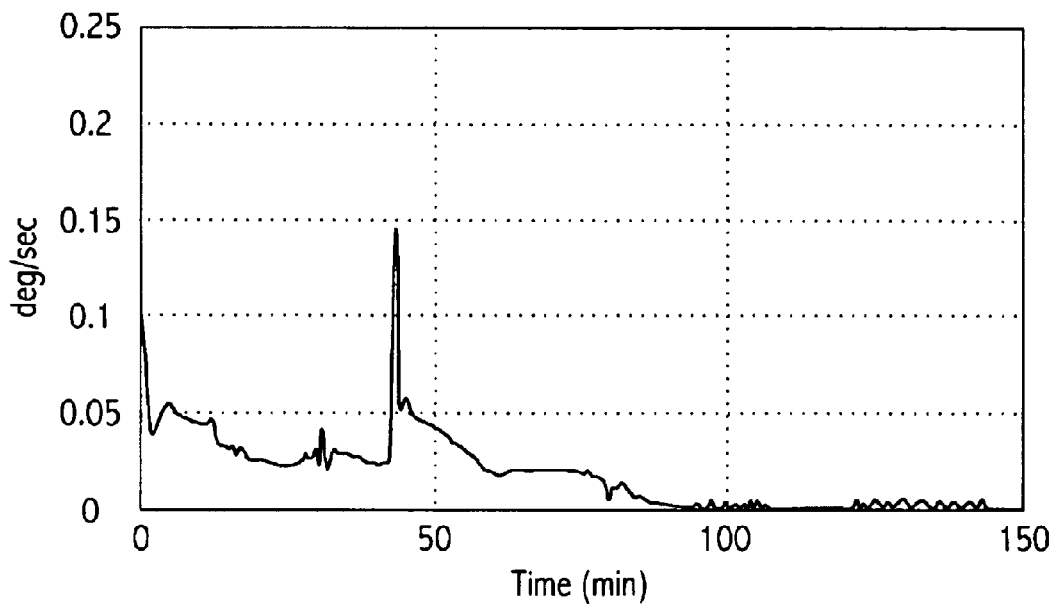
FIG. 6 shows the result of applying the method of the present invention to RSS Angular Velocity Error During First 150 Minutes, Measurements from One GPS Satellite of the Simulation Case 2.
Figure 7:
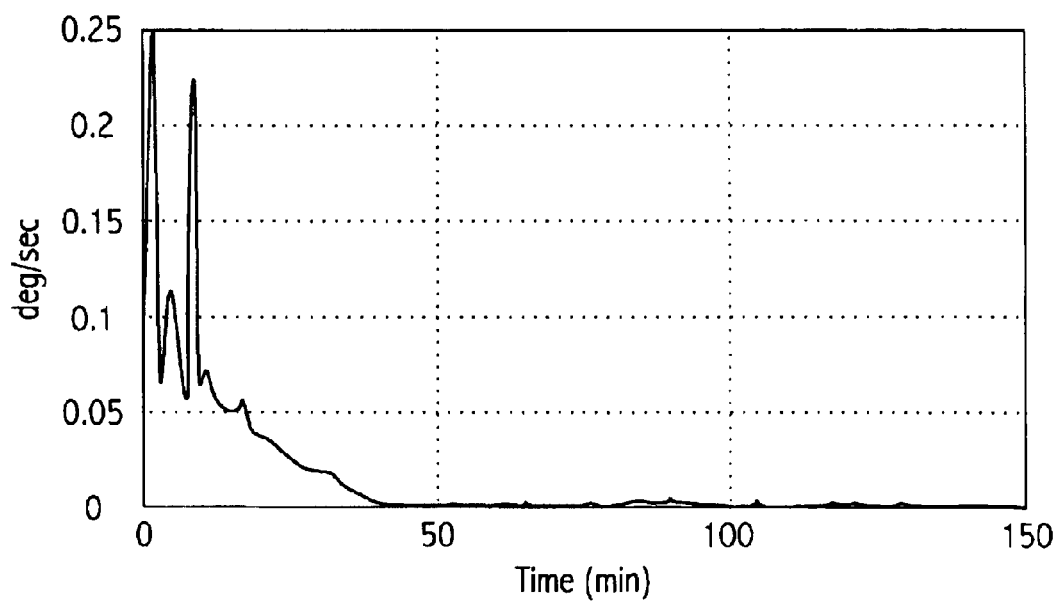
FIG. 7 shows the results of applying the method of the present invention RSS Angular Velocity Error During First 150 Minutes, Measurements from Two GPS Satellites of the Simulation Case 2.

FIGS. 6 and 7 show the RSS of the angular velocity errors for measurements from one and two GPS satellites, respectively, during the first 150 minutes of the data span. In both cases the estimation approach is used (as applied to the GPS phase measurements, recalling that the estimation approach is applied to the magnetometer). Here it can be seen that the use of two GPS satellites shortens the convergence time. After the transients have settled there is little difference between the two cases. The RSS rate errors using the derivative approach are slightly noisier, but show similar behavior to the estimation approach for both the one GPS and two GPS satellite scenarios. The jumps in the RSS errors within the first 50 minutes occur when there is a change to a different GPS satellite.

Figure 8:
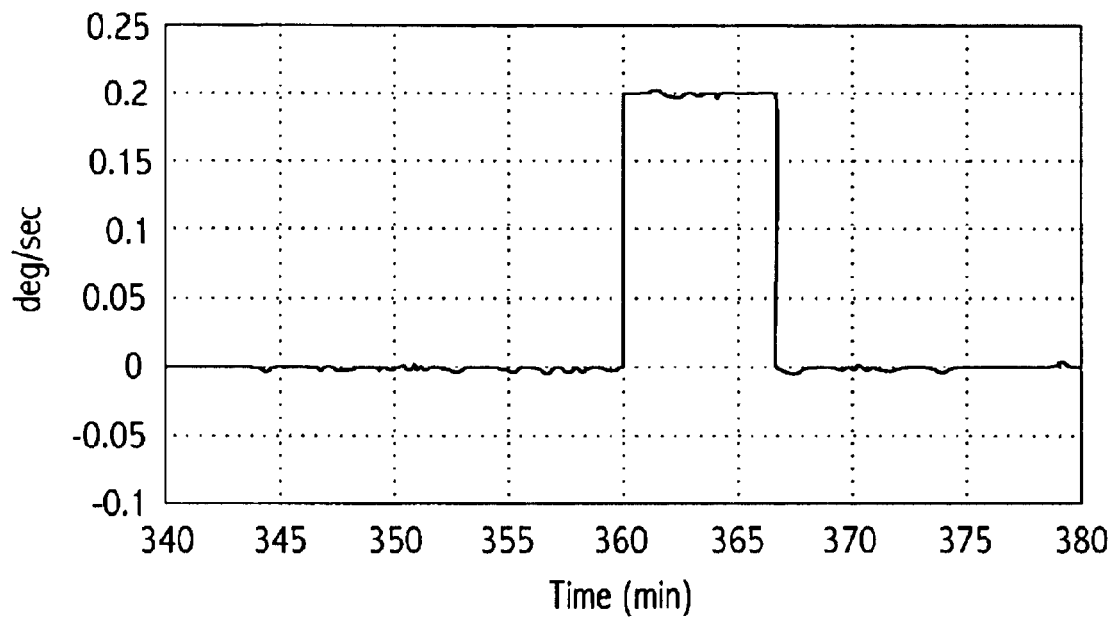
FIG. 8 shows the results of applying the method of the present invention Estimated Angular Velocity About Y Axis (Estimation Approach) of the Simulation Case 2.
Figure 9:
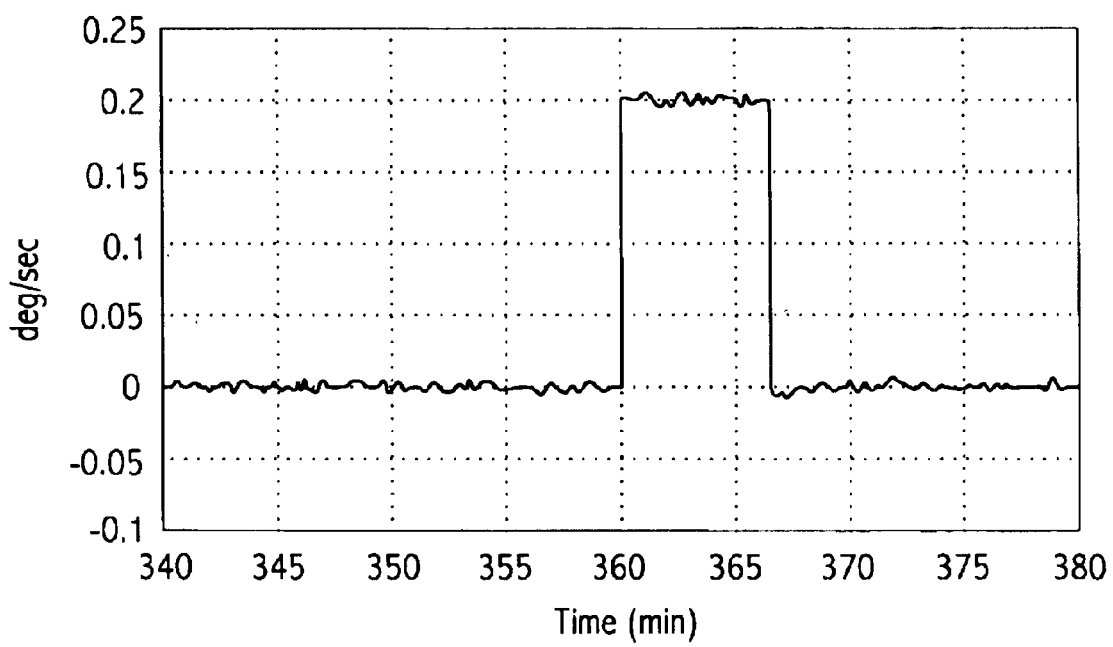
FIG. 9 shows the results of applying the method of the present invention Estimated Angular Velocity About Y Axis (Derivative Approach) of the Simulation Case 2.

FIGS. 8 and 9 show the estimated y angular velocity for the estimation and the derivative approaches, respectively, each using measurements from one GPS satellite. The time span in the Figures is during the attitude maneuver, which occurs after 6 hours. While in FIGS. 6 and 7 we compared the effect of one and two GPS satellites (because the difference between the estimation and derivative approaches was negligible), in FIGS. 8 and 9 we compare the two approaches because here the difference stems from the approaches and the difference between using one or two GPS satellites is negligible. In both cases, the filter follows the maneuver. The other two axes, namely the x and z axes, stay approximately at 0 deg/sec, similar to the estimated y rate both before and after the maneuver.

Figure 10:
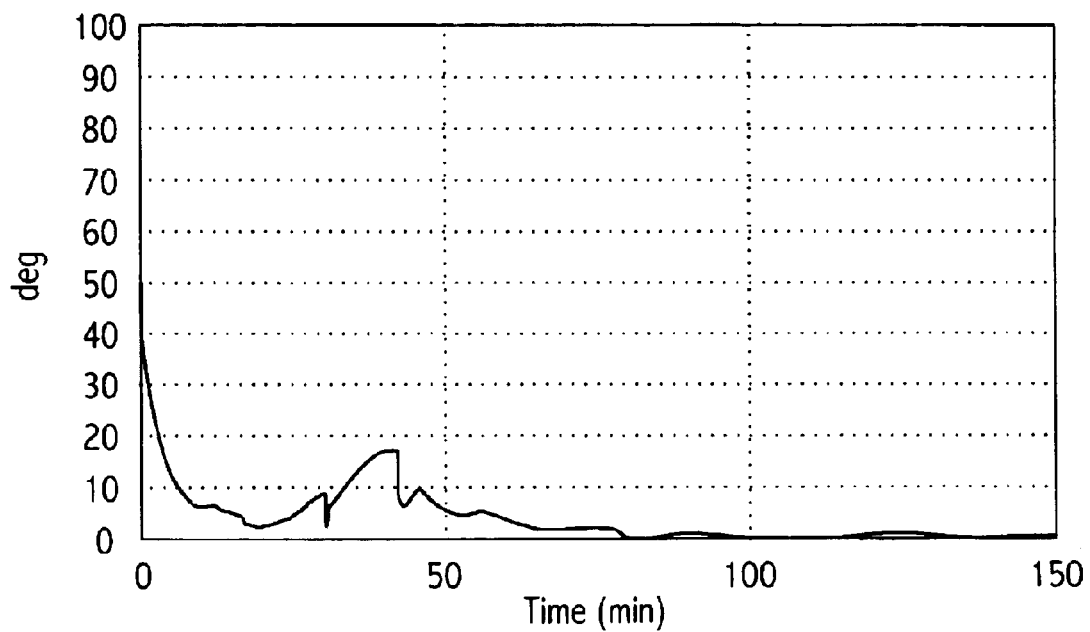
FIG. 10 shows the results of applying the method of the present invention RSS Attitude Error During First 150 Minutes, Measurements from One GPS of the Simulation Case 2.
Figure 11:
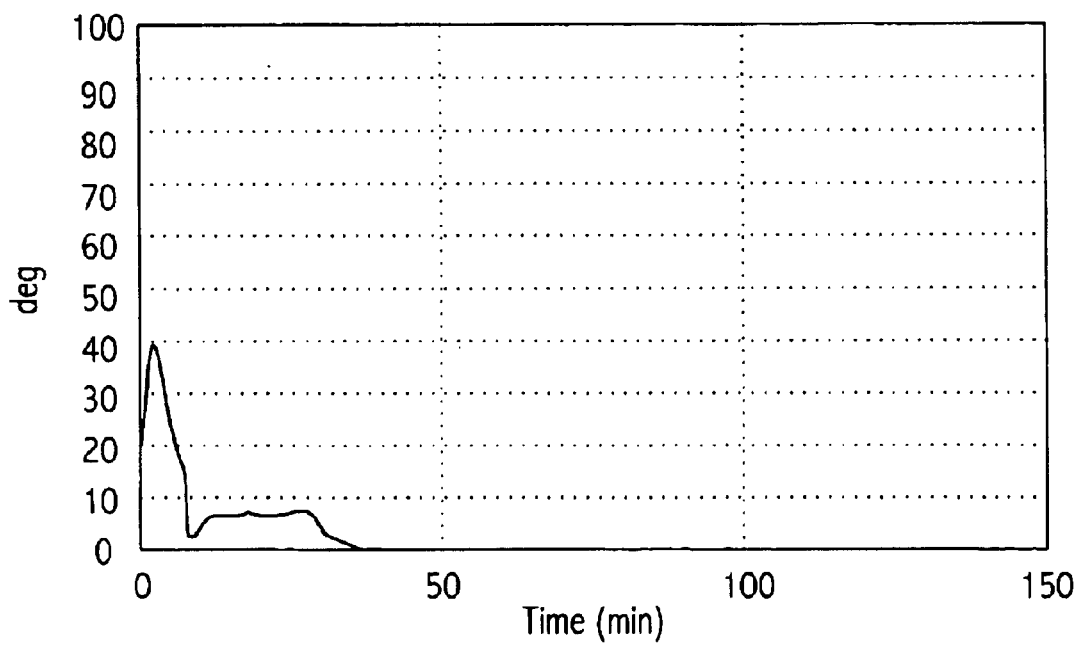
FIG. 11 shows the results of applying the method of the present invention RSS Attitude Error During First 150 Minutes, Measurements from Two GPS of the Simulation Case 2.

FIGS. 10 and 11 show the RSS attitude error during the first 150 minutes, using measurements from one and two GPS satellites, respectively, using the estimation approach. Again, the use of two GPS satellites shortens the convergence time. After the filter has converged the results are similar with final average errors of approximately 0.3 degrees (computed over the last 30 minutes). The derivative approach results are similar to the estimation approach results.

Figure 12:
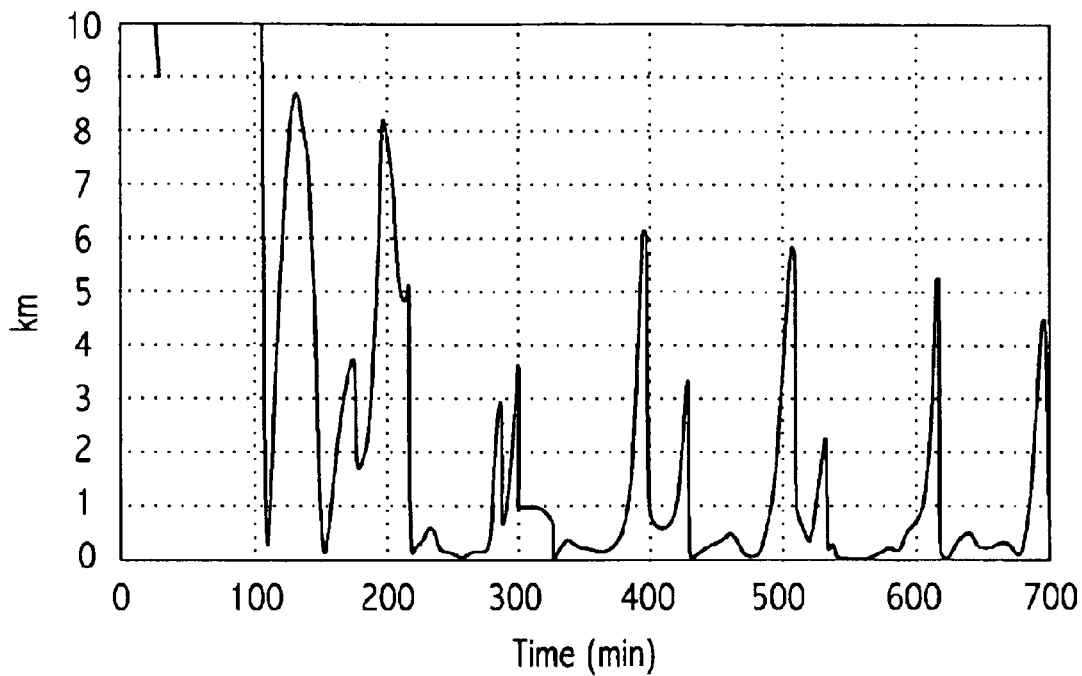
FIG. 12 shows the results of applying the method of the present invention RSS Position Error, Measurements from One GPS of the Simulation Case 2.
Figure 13:
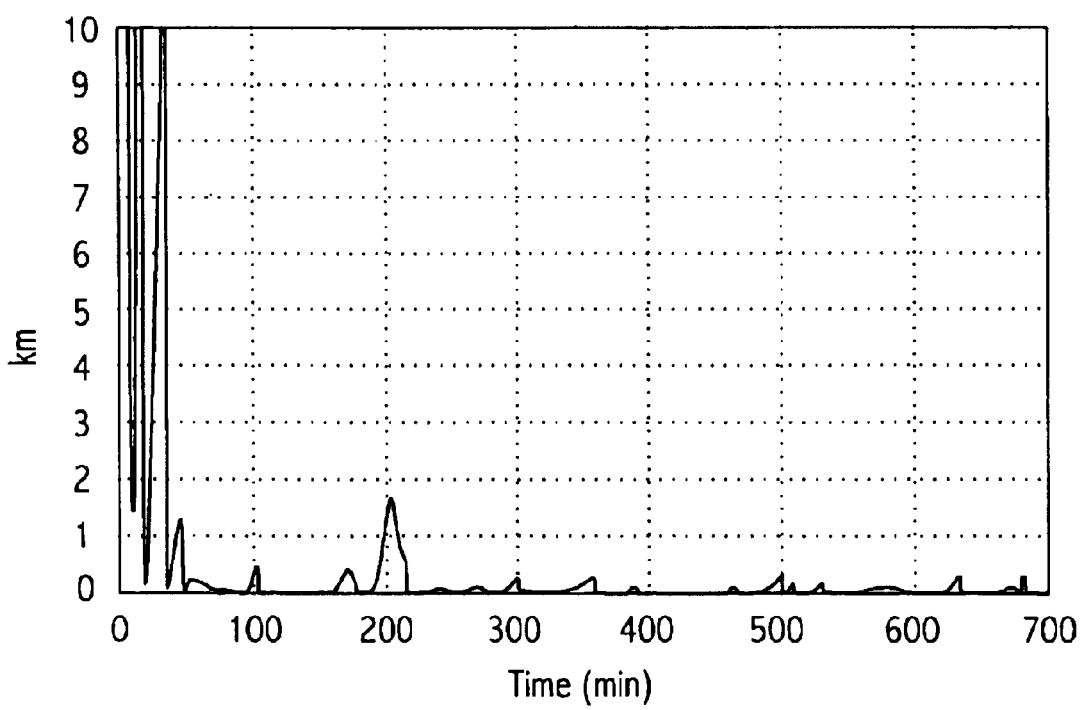
FIG. 13 shows the results of applying the method of the present invention RSS Position Error, Measurements from Two GPS of the Simulation Case 2.

Finally, FIGS. 12 and 13 show the RSS position errors for measurements from one and two GPS satellites, respectively, using the estimation approach. Here, the difference between using one or two GPS satellites is the most significant (the same is true for the velocity errors which have plots similar in shape to the position errors). After 12 hours, the one GPS case is still converging, with peak errors of about 4.5 km and an average RSS over the last 30 minutes of 0.8 km. The spikes in the errors occur due to a change in the GPS satellite and there is also an error from the magnetic field that occurs at the orbital period (approximately 90 minutes). In the case of using measurements from two GPS satellites, the effects of the changing GPS satellites are reduced. After 12 hours, the peak errors are reduced to less than 0.3 km with an average over the last 30 minutes of 30 m. The results for the final average RSS velocity errors are 6.6 cm/sec using two GPS versus 100 cm/sec when using one GPS.

What is claimed is:

1. An autonomous navigation system for determining a set of satellite navigation parameters including attitude, orbit, and rate, the system comprising:

a GPS receiver;

a magnetometer;

processing means for processing measurements from the GPS and magnetometer to estimate attitude, orbit, and rate.

2. The autonomous navigation system as in claim 1, wherein the measurements from the GPS comprises:

GPS pseudo-range; and GPS phase measurements.

3. The autonomous navigation system as in claim 2, wherein the measurements from the GPS further comprises GPS range rate.

4. The autonomous navigation system as in claim 1, the processing means comprising:

an algorithm comprising a Kalman filter.

5. The autonomous navigation system as in claim 4, wherein output filter state of the Kalman filter includes:

$\underline{X}^T = [\underline{R}^T, \underline{V}^T, \underline{C}^T, \underline{q}^T, \underline{\omega}^T]$, wherein $\underline{R}$ and $\underline{V}$ are the spacecraft position and velocity vectors, respectively, $\underline{C}$ is a vector of GPS receiver clock errors, $\underline{q}$ is the attitude quaternion, $\underline{\omega}$ is the rotation rate.

6. The autonomous navigation system as in claim 5, wherein the rate estimate is obtained by applying derivative approach to GPS phase measurements or magnetometer measurements.

7. The autonomous navigation system as in claim 5, wherein the rate estimate is obtained by applying derivative approach to GPS phase measurements and magnetometer measurements.

8. The autonomous navigation system as in claim 4, wherein output filter state of the Kalman filter includes:

$\underline{X}^T = [\underline{R}^T, \underline{V}^T, \underline{C}^T, \underline{q}^T, \underline{\omega}^T, \underline{b}^T]$, wherein $\underline{R}$ and $\underline{V}$ are the spacecraft position and velocity vectors, respectively, $\underline{C}$ is a vector of GPS receiver clock errors, $\underline{q}$ is the attitude quaternion, $\underline{\omega}$ is the rotation rate, and $\underline{b}$ is the magnetic field in body coordinates.

9. The autonomous navigation system as in claim 8, wherein the rate estimate is obtained by applying derivative approach to GPS phase measurements.

10. The autonomous navigation system as in claim 4, wherein output filter state of the Kalman filter includes:

$\underline{X}^T = [\underline{R}^T, \underline{V}^T, \underline{C}^T, \underline{q}^T, \underline{\omega}^T, \underline{z}^T]$, wherein $\underline{R}$ and $\underline{V}$ are the spacecraft position and velocity vectors, respectively, $\underline{C}$ is a vector of GPS receiver clock errors, $\underline{q}$ is the attitude quaternion, $\underline{\omega}$ is the rotation rate, and $\underline{z}$ is GPS phase measurement.

11. The autonomous navigation system as in claim 10, wherein the rate estimate is obtained by applying derivative approach to magnetometer measurements.

12. The autonomous navigation system as in claim 4, wherein output filter state of the Kalman filter includes:

$\underline{X}^T = [\underline{R}^T, \underline{V}^T, \underline{C}^T, \underline{q}^T, \underline{\omega}^T, \underline{b}^T, \underline{z}^T]$, wherein $\underline{R}$ and $\underline{V}$ are the spacecraft position and velocity vectors, respectively, $\underline{C}$ is a vector of GPS receiver clock errors, $\underline{b}$ is the attitude quaternion, $\underline{\omega}$ is the rotation rate, $\underline{b}$ is the magnetic field in body coordinates, and $\underline{z}$ is GPS phase measurement.

13. A method for estimating a set of navigation parameters of a satellite including attitude, orbit, and rate, the method comprising:

providing measurements from GPS;

providing measurements from magnetometer;

executing an algorithm to estimate attitude, orbit, and rate of the satellite based on the measurements from the GPS and magnetometer.

14. The method as in claim 13, wherein the measurements from the GPS comprises:

GPS pseudo-range; and

GPS phase measurements.

15. The method as in claim 14, wherein the measurements from the GPS further comprises GPS range rate.

16. The method as in claim 13, wherein the step of executing the algorithm includes performing Kalman filtering.

17. The method as in claim 16, wherein output filter state of the Kalman filter includes:

$\underline{X}^T = [\underline{R}^T, \underline{V}^T, \underline{C}^T, \underline{q}^T, \underline{\omega}^T]$, wherein $\underline{R}$ and $\underline{V}$ are the spacecraft position and velocity vectors, respectively, $\underline{C}$ is a vector of GPS receiver clock errors, $\underline{q}$ is the attitude quaternion, $\underline{\omega}$ is the rotation rate.

18. The method as in claim 17, wherein the rate estimate is obtained by applying derivative approach to GPS phase measurements or magnetometer measurements.

19. The method as in claim 17, wherein the rate estimate is obtained by applying derivative approach to GPS phase measurements and magnetometer measurements.

20. The method as in claim 16, wherein output filter state of the Kalman filter includes:

$\underline{X}^T = [\underline{R}^T, \underline{V}^T, \underline{C}^T, \underline{q}^T, \underline{\omega}^T, \underline{b}^T]$, wherein $\underline{R}$ and $\underline{V}$ are the spacecraft position and velocity vectors, respectively, $\underline{C}$ is a vector of GPS receiver clock errors, $\underline{q}$ is the attitude quaternion, $\underline{\omega}$ is the rotation rate, and $\underline{b}$ is the magnetic field in body coordinates.

21. The method as in claim 20, wherein the rate estimate is obtained by applying derivative approach to GPS phase measurements.

22. The method as in claim 16, wherein output filter state of the Kalman filter includes:

$\underline{X}^T = [\underline{R}^T, \underline{V}^T, \underline{C}^T, \underline{q}^T, \underline{\omega}^T, \underline{z}^T]$, wherein $\underline{R}$ and $\underline{V}$ are the spacecraft position and velocity vectors, respectively, $\underline{C}$ is a vector of GPS receiver clock errors $\underline{q}$ is the attitude quaternion, $\underline{\omega}$ is the rotation rate, and $\underline{z}$ is GPS phase measurement.

23. The method as in claim 22, wherein the rate estimate is obtained by applying derivative approach to magnetometer measurements.

24. The method as in claim 16, wherein output filter state of the Kalman filter includes:

$$\underline{X}^T = [\underline{R}^T, \underline{V}^T, \underline{C}^T, \underline{q}^T, \underline{\omega}^T, \underline{b}^T, \underline{z}^T],$$

wherein $\underline{R}$ and $\underline{V}$ are the spacecraft position and velocity vectors, respectively, $\underline{C}$ is a vector of GPS receiver clock errors, $\underline{q}$ is the attitude quaternion, $\underline{\omega}$ is the rotation rate, $\underline{b}$ is the magnetic field in body coordinates, and $\underline{z}$ is GPS phase measurement.

* * * * *

UNITED STATES PATENT AND TRADEMARK OFFICE
CERTIFICATE OF CORRECTION

| | | |
|---|---|---|
| PATENT NO. | : 6,760,664 B1 | Page 1 of 1 |
| APPLICATION NO. | : 10/178546 | |
| DATED | : July 6, 2004 | |
| INVENTOR(S) | : Julie K. Thienel, Richard R. Harman and Itzhack Y. Bar-Itzhack | |

It is certified that error appears in the above-identified patent and that said Letters Patent is hereby corrected as shown below:

Title Page, Item [75]
Inventors names are incorrect on the issued patent. Names should be corrected to the following:

Julie K. Thienel
Richard R. Harman
Itzhack Y. Bar-Itzhack

Signed and Sealed this

Twenty-sixth Day of June, 2007

JON W. DUDAS
*Director of the United States Patent and Trademark Office*